Patented Jan. 9, 1923.

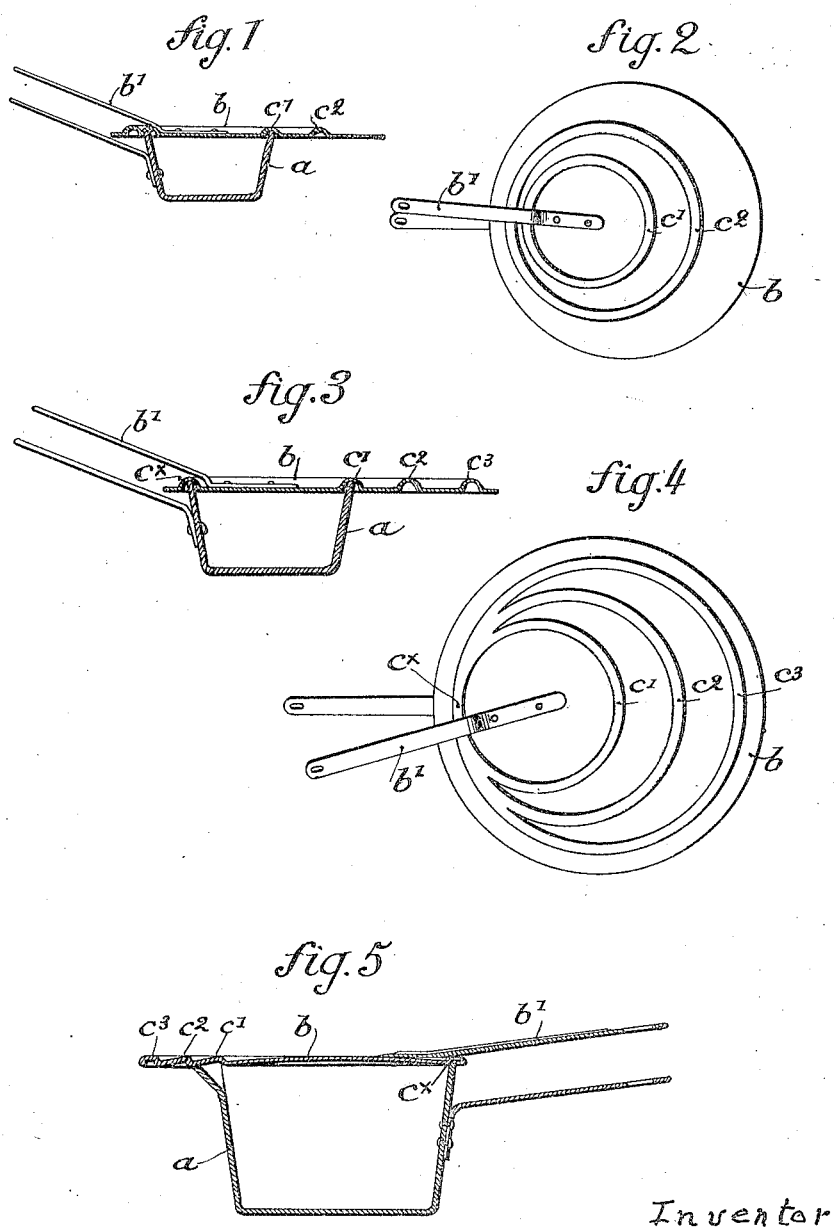

1,441,712

UNITED STATES PATENT OFFICE.

ARTHUR PIERRE PICARD, OF PARIS, FRANCE.

COVER FOR UTENSILS.

Application filed October 7, 1921. Serial No. 506,130.

*To all whom it may concern:*

Be it known that I, ARTHUR PIERRE PICARD, a citizen of the Republic of France, and residing at Paris, Seine Department, No. 81 Avenue Malakoff, in the Republic of France, have invented certain new and useful Improvements in Covers for Utensils, of which the following is a specification.

This invention relates to improvements in covers for cooking utensils or the like, whereby a given cover shall be adapted to fit upon utensils of different diameters or cross-sections while at the same time being provided with grooves or projections constituting stop portions for maintaining the different utensils in place and for causing the drops of condensed water formed during the cooking operation to fall again into the said utensils. To this effect the cover is given a sufficient diameter to cover the largest of the required set of utensils, and it is provided with a plurality of stop portions corresponding in shape and size to the edges of the various utensils. The said stop portions may be constituted by steps, grooves, projections, or the like which are obtained by the stamping or embossing process, by casting or moulding, or by the assembling of separate parts upon the under side of the said cover by any suitable means.

In case none of the utensils to be covered are provided with a handle, lug or like portion extending above the level of the edge of the utensil, all the stop portions may be placed in a concentric disposition. But as a general rule one or more of the said utensils will possess a handle or like part which extends above the edge of the utensil and would therefore act as a drawback to the proper fitting of the cover in case all the stop portions should occupy a concentric position. This difficulty is obviated by placing the whole or a part of the said stop portions in an eccentric disposition. In the case of curved stop portions, these may be situated tangent to each other at a common point.

The accompanying drawing shows by way of example three forms of construction of this invention.

Fig. 1 is a vertical section of an utensil provided with a cover according to the invention.

Fig. 2 is a plan view of the said cover.

Figs. 3 and 4 show in like manner a second form of construction.

Fig. 5 is a vertical section of a third form of construction.

$a$ indicates an utensil such as a saucepan and $b$ the cover. The latter is characterised by a plurality of stop portions $c^1$, $c^2$, $c^3$, etc., in variable number, for instance two Figs. 1 and 2, three as in Figs. 3 and 4, or more, according to the number of utensils used with a given cover.

In Figs. 1 and 2, the stop portions are in the eccentric position and are not tangent to each other. In Figs. 3 and 4, the three stop portions are tangent at the common point $c^x$. In case certain of the utensils should have the edge thereof disposed in other than a circular form, it may happen that the corresponding stop portions shall intersect one or more of the remaining stop portions. The said cover may be provided with a handle $b^1$ of straight or curved shape, or with a like portion for handling the cover.

In the modified form of construction shown in Fig. 5, the three stop portions $c^1$, $c^2$, $c^3$ are also in the tangent position at the common point $c^x$. They present this particular feature in that they have an angular cross-section, the side situated towards the centre of the cover being short and considerably inclined, whilst the outer side is only slightly inclined and encounters the base of the following stop portion by an easy incline. By this disposition, the beak of the saucepans or like vessels is adapted to fit under the stop portion and will not prevent the said cover from properly engaging the edge of the vessel.

Claims:

1. A cover adapted to be fitted indifferently upon various utensils of different diameters or sections, comprising a plurality of grooves adapted to engage the edges of the said utensils, the said grooves having an eccentric disposition and being tangent to each other at a common point adjacent the periphery of the said cover.

2. A cover adapted to be fitted indifferently upon various utensils of different diameters or sections, comprising a plurality of grooves adapted to engage the edges of the said utensils, the said grooves having an eccentric disposition and being tangent to each other at a common point adajacent the periphery of the said cover, the said grooves having an angular section with the internal side considerably inclined and the external side inclined at a slight slope.

In testimony, that I claim the foregoing as my invention I have signed my name in presence of a subscribing witness.

ARTHUR PIERRE PICARD.

Witness:
MAURICE ROWE.